(12) United States Patent
Yu

(10) Patent No.: US 7,722,187 B2
(45) Date of Patent: May 25, 2010

(54) FLY-WING ROTATING LENS EYEGLASSES

(75) Inventor: Chang Yu, 3705 Live Oak La., Greenville, NC (US) 27858

(73) Assignee: Chang Yu, Greenville, NC (US)

( * ) Notice: Subject to any disclaimer, the term of this patent is extended or adjusted under 35 U.S.C. 154(b) by 0 days.

(21) Appl. No.: 12/151,938

(22) Filed: May 10, 2008

(65) Prior Publication Data

US 2008/0239234 A1    Oct. 2, 2008

Related U.S. Application Data

(60) Provisional application No. 60/940,263, filed on May 25, 2007.

(51) Int. Cl.
*G02C 9/02* (2006.01)

(52) U.S. Cl. .......................................... 351/59; 351/63

(58) Field of Classification Search ................... 351/41, 351/59, 60, 63, 103–109
See application file for complete search history.

(56) References Cited

U.S. PATENT DOCUMENTS 7,278,732 B1 * 10/2007 Masterson ................... 351/59

* cited by examiner

*Primary Examiner*—Huy K Mai

(57) ABSTRACT

A spectacle frame and lens arrangement whereby each lens rotates up and out of the field of vision by pivoting about a central pivot mechanism in the frame which keeps the lenses within the same plane both in the park and use positions. This differs from traditional flip-up spectacles that operate by causing the lens to fold up and forward from the user's eyes or outward to each side. This is accomplished by a simple squeeze of the frame and lower edge of a single lens between the forefinger and thumb of one hand.

3 Claims, 4 Drawing Sheets

FLY-WING ROTATING LENS EYEGLASSES

RELATED U.S. APPLICATION DATA

Provisional application No. 60/940,263, filed on May 25, 2007.

CITED REFERENCES OF U.S. PATENT DOCUMENTS

| | | |
|---|---|---|
| 7,131,726 B2 | November 2006 | Kiyoshi Hiromoto |
| 4,740,069 | April 1988 | Richard M. Baum |
| 7,018,035 B1 | March 2006 | Jeffrey C. Herold |
| 6,264,325 B1 | July 2001 | Leonie S. Peressini et al |
| 7,011,403 B1 | March 2006 | Esther Pacheco |
| 4,187,006 | February 1980 | Saul Neidell |
| 6,2577,18 | July 2001 | Jack N |
| 6,742,888 | June 2004 | Jong Kim |
| 6,644,804 | November 2003 | H. Jay Spiegel |

BACKGROUND OF THE INVENTION

The present invention relates to a spectacle frame with a pivoting mechanism connected to a lens hanger that allows the lenses to be rotated in a plane that keeps the lens in the same plane in the working state and the parked state. This has the advantage over traditional flip-away lens arrangements by not interfering with the wearer when working in close quarters, such as when using a microscope or making repairs where the flip-away lens devices would not be useable without removing them. While some people need to wear their glasses at all the time, others only need them for specific situations, such as reading or working on the computer. These individuals can find that they are constantly putting on and removing their frames, which is inconvenient and presents an opportunity for the frames to become misplaced or damaged.

BRIEF SUMMARY OF THE INVENTION

The present invention relates to eyeglasses and more particularly pertains to rotating lens eyeglasses for allowing exchange between standby and use without removing eyeglasses.

BRIEF DESCRIPTION OF THE DRAWINGS

The drawings illustrate the construction and operation presently contemplated for the present invention.

DETAILED DESCRIPTION OF THE PREFERRED EMBODIMENTS

Figure 1:
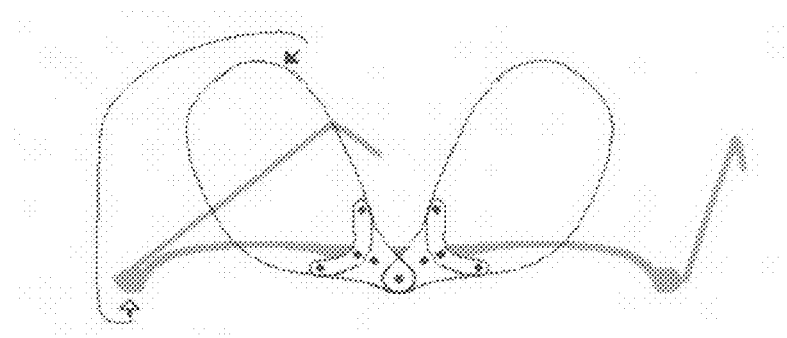
FIG. 1 is a view showing the rotating lens glasses in its standby state.
Figure 2:
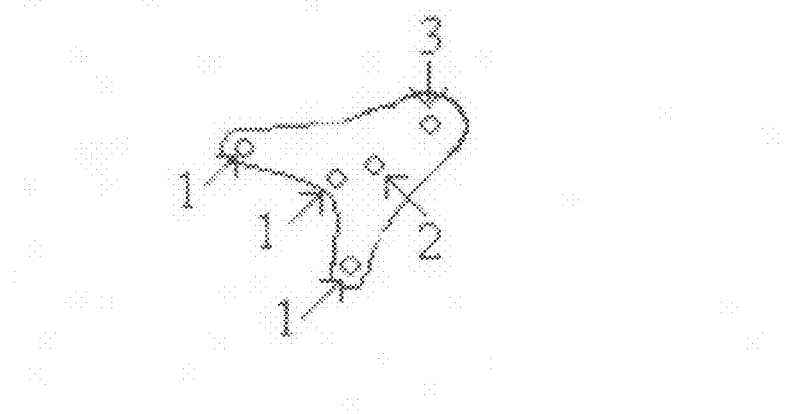
FIG. 2 is a view showing the first connecting portion.
Figure 3:
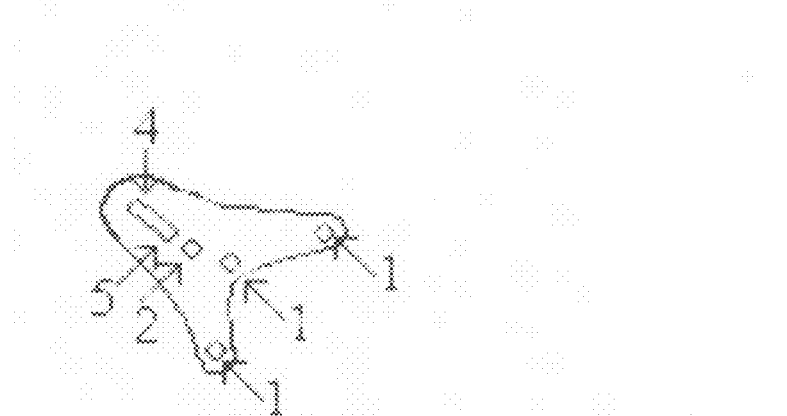
FIG. 3 is a view showing the second connecting portion.
Figure 4:
FIG. 4 is a view of the slipping axle, which may be either tubular or solid, as shown in more detail in FIGS. 11A and 11B.
Figure 5:
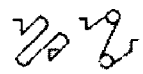
FIG. 5 is a view of two versions of the single flat spring used.
Figure 6:
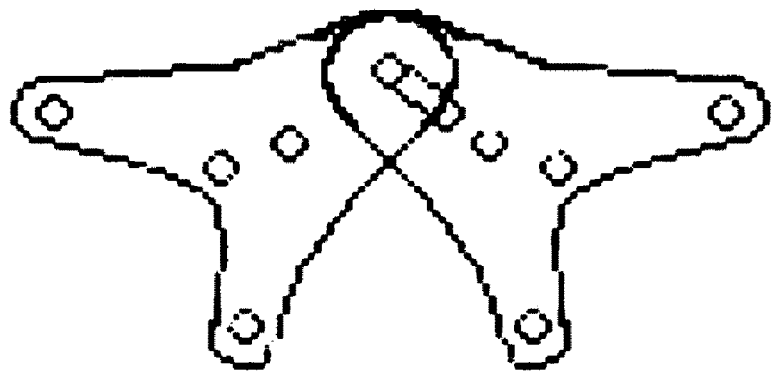
FIG. 6 illustrates the relation among FIGS. 2, 3 and 4.
Figure 7:
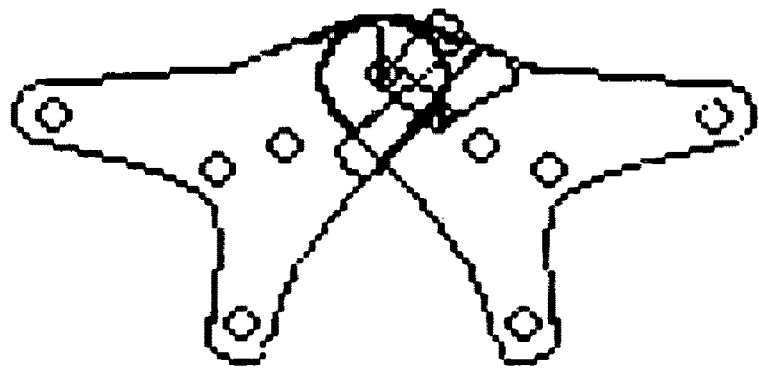
FIG. 7 is a detail view of FIGS. 2 through 5, as FIG. 6 with the spring.
Figure 8:
FIG. 8 is a view of the screw.
Figure 9:
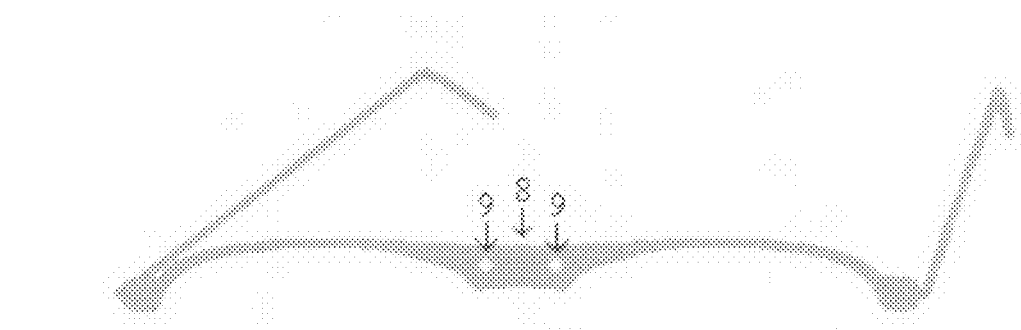
FIG. 9 is a view showing the frame.
Figure 10:
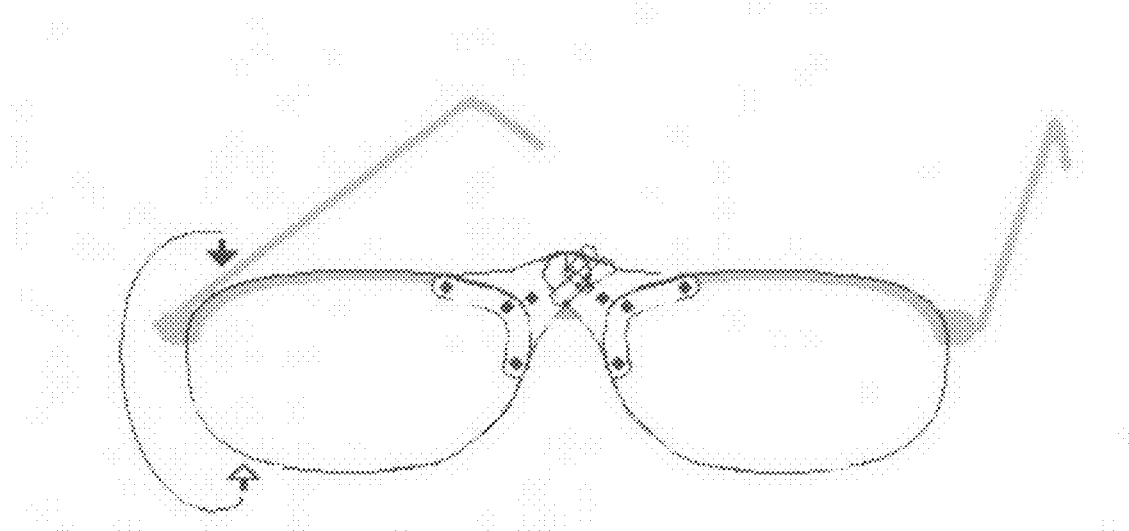
FIG. 10 is a view showing the rotating glasses in the working state.
Figure 11A:
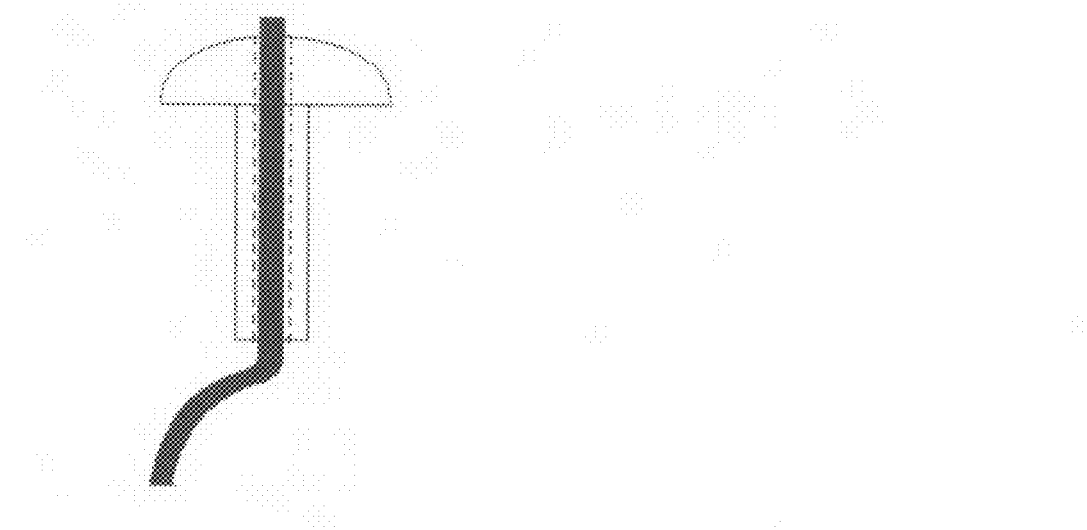
FIGS. 11A and 11B show two ways of the spring connection to the slipping axle.
Figure 11B:
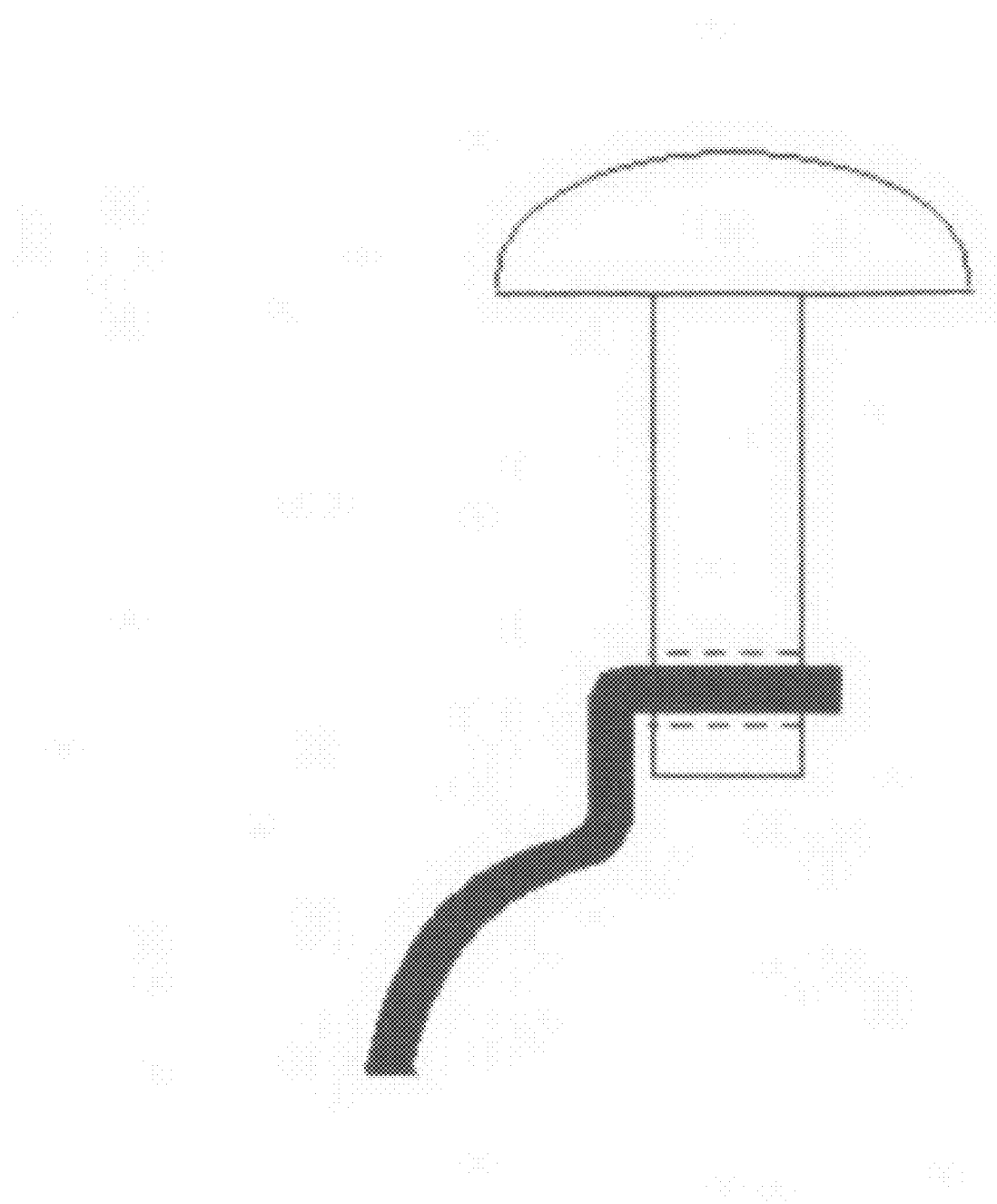

The glasses shown in FIG. 1 of the present invention are in the standby state. They are depicted in a position fixed lenses to the frame shown in FIG. 9 and lenses connected by foldaway connecting portion which is shown in FIG. 6 without spring and FIG. 7 with spring. The foldaway connecting portion is comprised of a first connecting portion shown in FIG. 2 and a second connecting portion shown in FIG. 3. The first connecting portion has five holes 1-3, the second connecting portion has four holes 1-2 and a slipping slot 5, the first connecting portion attaches to the second connecting portion by the slipping axle shown in FIG. 4 in holes 3 and the slipping slot 4, the foldaway connecting portion connects with the frame by the screws shown in FIG. 8 through holes 2 and 9. One end of the spring shown in FIG. 5 is attached to the slipping axle in two different ways shown in FIG. 11A and FIG. 11B, and the other end is attached to the end of the slipping slot 5. The frame has two holes 9 whose distance is between 0.8 cm and 2.5 cm, depending on the desired angle of the lenses in the standby state. The first connecting portion and the second connecting portion has an angle in the standby state, the degree determined by the distance of the two holes of the frame and the distance of holes 3 and 2, about 30-120 degrees. The glasses shown in FIG. 10 are in working state.

SUMMARY

The descriptions in this document are applicable to a specific arrangement for achieving the desired objective, but do not preclude other variations in the mechanism to accomplish the function desired, which is to be able to park spectacle lenses above the operating position without removing them or otherwise having them go out of the plane of use. The benefit to the user is to conveniently keep the spectacles readily available when not in use, saving time and reducing the risk of loss or damage to the spectacles, as well as easily returning them to service.

What is claimed is:

1. A pair of glasses comprising a frame and lenses connected by foldaway connecting portion, said foldaway connecting portion comprising a first connecting portion and a second connecting portion connecting by a slipping axle, both said first connecting portion and said second connecting portion connecting with said frame, said second connecting portion further comprising a slipping slot which slipping by said slipping axle foldaway connecting with said first connecting portion, said foldaway connecting portion further comprising a flat spring fixing one end to said slipping axle and the other end to said second connecting portion.

2. The glasses of claim 1, wherein said slipping axle is either tubular with one end of the spring inside the axle or the slipping axle is solid with an end hole to which the said end of the spring is attached.

3. The glasses of claim 1, wherein said frame comprising holes and said first and second connecting portions comprising holes wherein the frame hole and the corresponding connecting portion hole connected to each other by screw or rivet.

\* \* \* \* \*